United States Patent [19]

Ferrero

[11] Patent Number: 4,820,470

[45] Date of Patent: Apr. 11, 1989

[54] METHOD AND APPARATUS FOR EXTRUSION, PARTICULARLY FOR EXTRUDING MASSES OF FOOD PRODUCTS

[75] Inventor: Pietro Ferrero, Brussels, Belgium

[73] Assignee: Ferrero S.p.A., Turin, Italy

[21] Appl. No.: 71,876

[22] Filed: Jul. 10, 1987

[30] Foreign Application Priority Data

Jul. 11, 1986 [IT] Italy ............................... 67561 A/86

[51] Int. Cl.⁴ .............................................. B29B 9/06
[52] U.S. Cl. ...................................... 264/555; 264/141;
264/148; 425/72.1; 425/106; 425/311; 426/516;
426/518
[58] Field of Search ................................ 264/141–143,
264/504, 148, 500, 555; 425/96, 107, 308, 313,
72.1, 94, 106, 311, 378.1; 426/503, 516–518

[56] References Cited

U.S. PATENT DOCUMENTS

| | | | |
|---|---|---|---|
| 2,149,920 | 3/1939 | Kretchmer | 425/94 |
| 3,527,851 | 9/1970 | Bulgin | 425/72.1 |
| 3,767,748 | 10/1973 | Rosette | 264/500 |
| 3,981,959 | 9/1976 | Cuff | 264/142 |
| 4,038,002 | 7/1977 | Inaba et al. | 425/313 |
| 4,151,251 | 4/1979 | Kropa | 264/142 |
| 4,321,026 | 3/1982 | Lambertus | 425/142 |

FOREIGN PATENT DOCUMENTS 56-142014  11/1981  Japan ................................. 264/142

Primary Examiner—Jeffery Thurlow
Attorney, Agent, or Firm—Bernard, Rothwell & Brown

[57] ABSTRACT

The mass to be extruded is forced into an extrusion duct (die) (1) so as to make it emerge in the extruded state from the outlet end (3) of the duct in a direction (2) generally-axial of the duct itself. An annular flow of fluid is generated around the outlet end (3) of the extrusion duct (1), oriented in an axial direction relative to the extrusion duct (1), and surrounds the extruded mass, preventing it from bending accidentally. The extruded mass is divided into pieces by a cutting operation (9) carried out within (7) the zone in which the annular flow of fluid acts.

14 Claims, 1 Drawing Sheet

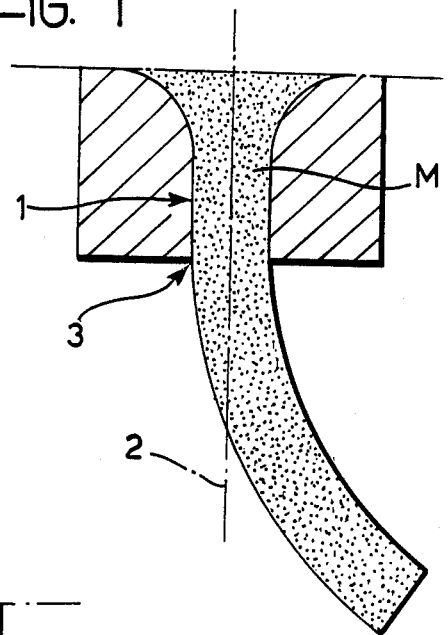
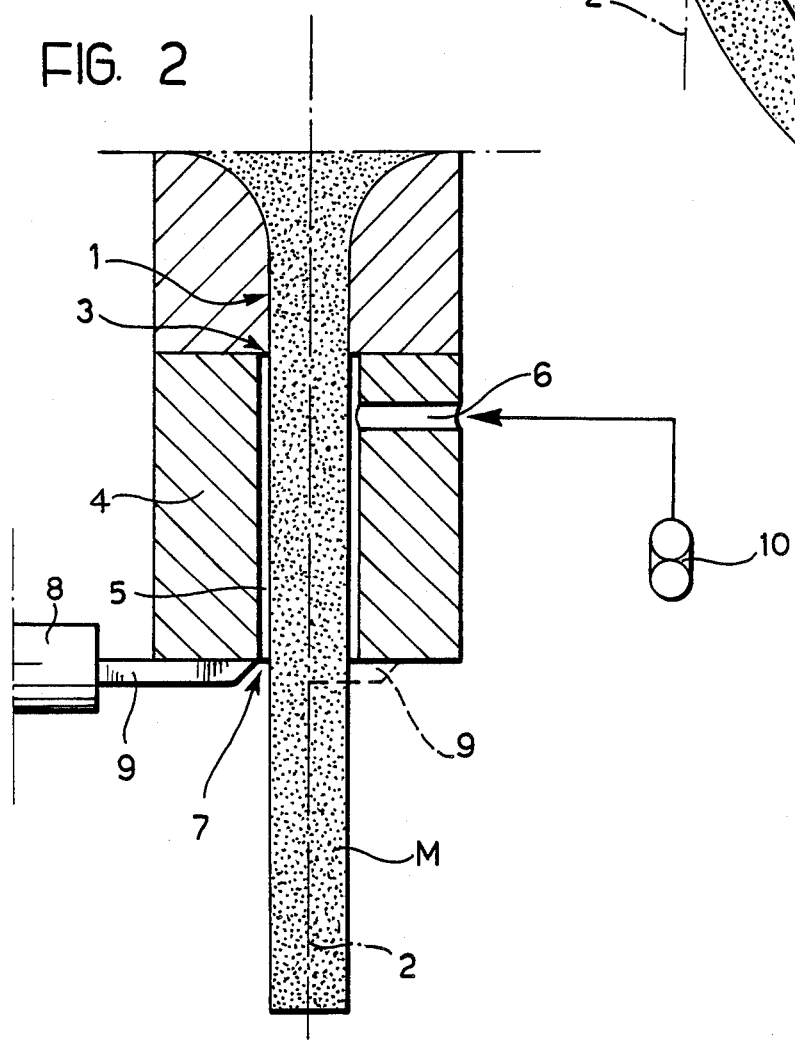

METHOD AND APPARATUS FOR EXTRUSION, PARTICULARLY FOR EXTRUDING MASSES OF FOOD PRODUCTS

BACKGROUND OF THE INVENTION

The present invention relates to the extrusion of masses through an extrusion duct (die) having an outlet end of predetermined diametral dimensions, in which the mass to be extruded is forced into the duct and emerges from the outlet end of the extrusion duct in the extruded state in a generally-axial direction relative to the extrusion duct itself.

FIG. 1 of the appended drawings illustrates schematically, in axial section, an extrusion device operating according to the prior art. In this case the mass which is being extruded is generally indicated M. The extrusion duct or die is indicated 1 and its outlet end, centred around the principal axis 2 of the duct 1, is indicated 3.

The means which allow the necessary pressure to be exerted on the mass M to be extruded to force it into the extrusion duct 1 are considered to be generally known. Furthermore, their structure and configuration are not relevant per se, either for an understanding of the technical problem on which the invention is based, or for an understanding of the solution according to the invention.

The Applicant has noticed that, when an extrusion structure of the type illustrated in FIG. 1 is used to extrude an edible, pasty mass, such as a mixture of sugar and pectin, with quite a high linear extrusion velocity, for example of the order of 10-15 m/min or more, deformation of the extruded mass occurs, causing it to move away from the principal axis 2 of the extrusion duct 1, as illustrated schematically in the lower part of FIG. 1.

This occurs even when the extrusion is carried out vertically, that is with the duct 1 held with its principal axis 2 disposed vertically. Without wishing to tie himself to any specific theory in this regard, the Applicant has reason to believe that the bending of the extruded mass can be attributed essentially to the manifestation of localised adhesion of the external walls of the extruded mass to the edge of the end 3 of the extrusion duct 1.

In any case, the bending of the extruded mass is such that, when the mass is subsequently divided into pieces by a cutting operation, carried out, for example, with a rotary blade, the pieces obtained are generally curved in shape, or, so to speak, bean- or banana-shaped.

This problem is particularly serious when the pieces obtained from the extruded mass are intended to be coated subsequently in order to form products of the type generally known as "dragees".

For example, the coated product sold by the Applicant under the Trade name "TIC-TAC" includes a centre produced from a mixture of sugar and pectin, having a cylindrical shape with a length of approximately 9 mm and a diameter of approximately 2 mm. Up to now, a moulding process has had to be used to make these centers, as it has not been possible — for the reasons explained above — to use a method of extrusion and subsequent cutting.

SUMMARY OF THE INVENTION

The object of the present invention is to provide a method for extruding masses, and in particular edible masses, through an extrusion duct, which does not give rise to the problems explained above, particularly as regards the possibility of obtaining a mass in the extruded state which does not bend at the outlet of the extrusion duct and which can thus be divided into substantially cylindrical pieces.

According to the present invention, this object is achieved by means of a method of the type specified above, characterised in that it includes the operation of generating, around the outlet end of the extrusion duct, an annular flow of fluid oriented in an axial direction relation to the extrusion duct itself and surrounding the extruded mass emerging from the outlet end.

Preferably, the annular flow moves in the same direction as the extruded mass and is generated in a zone which extends for a certain distance from the outlet end of the extrusion duct, in an axial direction relative to the extrusion duct itself; the extruded mass is then divided into pieces by a cutting operation carried out within this zone.

The invention also relates to a device for extruding edible masses by a method having the characteristics specified above, characterised in that it includes:

a tubular duct extending as an elongation of the extrusion duct from its outlet end in an axial direction relative to the extrusion duct itself; the tubular duct having generally greater diametral dimensions than the predetermined diametral dimensions of the outlet end of the extrusion duct, so that, in use, the tubular duct defines an annular separation zone around the extruded mass emerging from the outlet end of the extrusion duct, and pressurised-fluid supply means provided with outlets opening into the annular separation zone.

BRIEF DESCRIPTION OF THE DRAWINGS

The invention will now be described, purely by way of non-limiting example, with reference to the appended drawings, in which:

FIG. 1, which refers to the prior art, has already been described above, and

FIG. 2 illustrates schematically, also in axial section, a device for carrying out the extrusion method of the invention.

DETAILED DESCRIPTION OF THE INVENTION

In FIG. 2, the same reference numerals 1 to 3 have been used to indicate parts corresponding to those already described with reference to FIG. 1, that is to say, the extrusion duct, its principal axis and its outlet opening.

For simplicity of explanation, reference will be made here to an extrusion duct 1 which, like its outlet end 3, has a completely circular section with a predetermined diameter.

For example, with reference to the product mentioned in the introduction to the description, the opening 3 may have a diameter of approximately 2 mm.

A tubular or sleeve-shaped body indicated 4 has a cylindrical through-hole 5 with a slightly greater diameter than that of the opening 3.

The body 4 is applied to the outlet 3 of the extrusion duct 1 in alignment with its principal axis 2.

The hole 5 of the body 4 thus defines a tubular duct which extends as an elongation of the extrusion duct 1 from its outlet end 3 and in an axial direction relative to the extrusion duct 1. As shown is FIG. 2, body 4 has a length that is greater than the diameter of the passageway therein.

This auxiliary or additional tubular duct has a generally greater diameter than the predetermined diameter of the outlet end 3 of the extrusion duct 1. Consequently, in use, the wall of the cavity 5 defines an annular separation zone around the external surface of the extruded mass M emerging from the duct 1 at a linear extrusion velocity of at least 10 m/min, for example, 10-15 m/min or more.

A source of pressurised fluid supplies at least one supply duct 6 which opens into this annular zone, preferably adjacent the outlet end 3 of the duct 1, the pressure source consisting, for example, of a pump unit 10 which supplies air (possibly purified and dehumidified) into the duct 6 at a relative pressure in the range 0.5 to 1.5 atmospheres, preferably approximately 1 atmosphere.

Operation of the pump unit 21 causes compressed air to flow into the annular separation zone between the internal wall of the cavity 5 and the mass M which emerges, in the extruded state, from the extrusion duct 1.

An annular fluid flow (air or gas) is thus generated around the outlet end 3 of the extrusion duct 1 and tends to emerge from the annular zone at the open end 7 of the cavity 5 opposite the outlet end 3 of the extrusion duct 1.

The annular fluid flow thus created is centered around the principal axis 2 and therefore moves axially of the extrusion duct 1 in the same direction as the movement of the extruded mass emerging from the outlet end 3 of the extrusion duct 1.

The function of this annular fluid flow, which surrounds the mass in the extruded state, is essentially that of stabilising the mass, to prevent it from bending, as illustrated schematically in FIG. 1 with reference to the prior art.

In other words, the flow which is established within the cavity 5 (formed of air, which, like the extruded mass, is at a temperature substantially equal to the ambient temperature) forms a sort of tubular guide which surrounds the extruded mass, keeping it straight without, however, any physical contact with the wall of the cavity 5 recurring.

In particular, although the best extrusion results are obtained from vertical operation, that is, with the principal axis 2 common to the extrusion duct 1 and the auxiliary tubular duct 4 kept vertical, the guiding of the extruded mass by the annular flow of compressed air is effective even when the process is carried out with the axis 2 inclined to the vertical.

A cutting element is generally indicated 8 and consists, for example, of a rotary cutter, whose blade 9 acts on the extruded mass M to divide it into pieces at the outlet end 7 of the cavity 5.

The Applicant has, in fact, been able to observe that qualitatively better results are obtained when the cutting operation is carried out within the zone in which the annular stabilising flow acts.

The effects of this flow are apparent in a zone which extends for a certain distance from the outlet end 3 of the extrusion duct 1 in an axial direction relative to the extrusion duct 1 itself. The effects of this action gradually decrease with increasing distance from the outlet end 7 in which the annular flow acts. It is therefore preferable to operate strictly adjacent (and virtually coincident with) the outlet end, that is, still keeping within the zone in which the annular fluid flow acts.

Even though the use of a gas flow is considered preferable, it should be remembered that functionally similar results can be obtained by generating a flow of liquid (for example a food lubricant) within the cavity 5, supplied under pressure through the duct 6.

Naturally, the principle of the invention remaining the same, the details of realisation and forms of embodiment can be varied widely with respect to those described and illustrated, without thereby departing from the scope of the present invention.

I claim:

1. A method for extruding masses through an extrusion duct (die) having an outlet end of fixed diametral dimensions, in which the mass to be extruded is forced into the duct and emerges in the extruded state from the outlet end of the extrusion duct in a generally axial direction relative to the extrusion duct, including the operation of generating around the outlet end of the extrusion duct, an annular flow of fluid oriented in an axial direction relative to the extrusion duct itself and surrounding the extruded mass emerging from the outlet end so as to prevent bending of the extruded mass at the outlet of the extrusion duct.

2. A method according to claim 1, including the operation of generating the annular fluid flow in a zone extending for a certain distance from the outlet end of the extrusion duct in an axial direction relative to the extrusion duct itself and the operation of dividing the extruded mass into pieces by a cutting operation carried out within the said zone.

3. A method according to claim 1, in which the annular fluid flow is generated in the same direction as the direction of movement of the extruded mass emerging from the outlet end.

4. A method according to claim 1, in which the fluid flow consists of a gas flow.

5. A method according to claim 1, in which, the extrusion duct is oriented substantially vertically.

6. A device for the extrusion of edible masses including
   (a) an extrusion duct having an outlet end of fixed diametral dimension, in which a mass to be extruded is forced into the duct and emerges in an extruded state from the outlet end of the extrusion duct in a generally axial direction relative to the extrusion duct, and
   (b) means for preventing the extruded mass from bending at the outlet of the extrusion duct, comprising:
      (i) a tubular sleeve extending as an elongation of the extrusion duct from its outlet end in an axial direction relative to the extrusion duct itself; the tubular sleeve having diametral dimensions generally greater than the predetermined diametral dimensions of the outlet end of the extrusion duct so that, in use, the tubular sleeve defines an annular separation zone around the extruded mass emerging from the outlet end of the extrusion duct, and
      (ii) pressurized-fluid supply means provided with outlets opening into the annular separation zone so as to generate around the outlet end of the extrusion duct, an annular flow of fluid oriented in an axial direction relative to the extrusion duct itself and surrounding the extruded mass emerging from the outlet end of the extrusion duct, and thereby prevent bending of the extruded mass at said outlet.

7. A device according to claim 6, in which the outlets are located principally adjacent the outlet end of the extrusion duct.

8. A device according to claim 6, in which the fluid-supply means comprise a compressed gas source.

9. A device according to claim 8, in which the gas source generates gas at a relative pressure within the range substantially 0.5 to 1.5 atmospheres.

10. A device according to claim 8, in which the gas source generates gas at a relative pressure of substantially 1 atmosphere.

11. A device according to claim 6, in which the tubular sleeve has an inlet end applied to the outlet end of the extrusion duct and an outlet end, and in which cutting means are provided for dividing the extruded mass emerging from the outlet end of the extrusion sleeve into pieces, the cutting means acting in correspondence with the outlet end of the tubular sleeve.

12. A method for extruding and cutting edible masses, comprising:
    (a) passing an edible mass through an extrusion duct so that the mass emerges from an outlet end of the duct in an extruded state in a generally axial direction relative to the extrusion duct at a linear extrusion velocity of at least 10 m/min,
    (b) generating around the outlet end of the extrusion duct, a zone comprising an annular flow of gas oriented in an axial direction relative to the extrusion duct itself and surrounding the extruded mass emerging from the outlet end so as to prevent bending of the extruded mass at the outlet of the extrusion duct, and then
    (c) cutting the extruded mass within said zone into substantially cylindrical pieces.

13. A method for extruding and cutting edible masses, comprising:
    (a) passing an edible mass through an extrusion duct so that the mass emerges from an outlet end of the duct in an extruded state in a generally axially direction relative to the extrusion duct and at a linear extrusion velocity of at least 10 m/min,
    (b) Passing the extruded mass through a tubular sleeve extending as an elongation of the extrusion duct from its outlet end in an axially direction relative to the extrusion duct itself, the tubular sleeve having a diameter greater than the diameter of the outlet end of the extrusion duct so that the tubular sleeve defines an annular separation zone around the extruded mass emerging from the outlet end of the extrusion duct, the tubular sleeve having a sleeve outlet through which the extruded mass passes,
    (c) generating within the tubular sleeve a zone comprising an annular flow of gas oriented in an axial direction relative to the extrusion duct itself and surrounding the extruded mass emerging from the outlet end of the extrusion duct, so as to prevent bending of the extruded mass at the outlet of the extrusion duct, said zone extending outside the outlet of the tubular sleeve, and
    (d) cutting the extruded mass in said zone immediately adjacent the outlet of the tubular sleeve to form substantially cylindrical edible pieces.

14. A device for the extrusion and cutting of edible masses, comprising:
    (a) an extrusion duct having an outlet end with a first diameter, in which a mass to be extruded is forced into the duct and emerges in an extruded state from the outlet end of the extrusion duct in a generally axial direction relative to the extrusion duct,
    (b) a tubular sleeve extending as an elongation of the extrusion duct from its outlet end in an axial direction relative to the extrusion duct itself, the tubular sleeve having a diameter greater than the diameter of the outlet end of the extrusion duct so that the tubular sleeve defines an annular separation zone around the extruded mass emerging from the outlet end of the extrusion duct, the tubular sleeve having a length greater than its internal diameter, and a sleeve outlet through which the extruded mass passes,
    (c) means for generating within the tubular sleeve a zone around the outlet end of the extrusion duct, the zone comprising an annular flow of fluid oriented in an axial direction relative to the extrusion duct itself and surrounding the extruded mass emerging from the outlet end so as to prevent bending of the extruded mass at the outlet of the extrusion duct, said zone extending outside the sleeve outlet, and
    (d) a knife adjacent to the sleeve outlet for cutting the extruded mass within said zone in which the annular fluid acts, so as to divide the extruded mass into substantially cylindrical pieces.

* * * * *

UNITED STATES PATENT AND TRADEMARK OFFICE
CERTIFICATE OF CORRECTION

PATENT NO. : 4,820,470
DATED : APRIL 11, 1989
INVENTOR(S) : PIETRO FERRERO

It is certified that error appears in the above-identified patent and that said Letters Patent is hereby corrected as shown below:

Column 3, line 17, delete "21" and substitute therefor -- 10 --.

Signed and Sealed this

Thirty-first Day of December, 1991

Attest:

HARRY F. MANBECK, JR.

*Attesting Officer*      *Commissioner of Patents and Trademarks*